United States Patent [19]

Nakamura et al.

[11] Patent Number: 4,970,424
[45] Date of Patent: Nov. 13, 1990

[54] ROTOR CONSTRUCTION FOR HIGH SPEED INDUCTION MOTOR

[75] Inventors: Kosei Nakamura; Yoshiyuki Hayashi, both of Yamanashi, Japan

[73] Assignee: Fanuc Ltd., Yamanashi, Japan

[21] Appl. No.: 391,614

[22] PCT Filed: Nov. 14, 1988

[86] PCT No.: PCT/JP88/01144

§ 371 Date: Jul. 14, 1989

§ 102(e) Date: Jul. 14, 1989

[87] PCT Pub. No.: WO89/05054

PCT Pub. Date: Jun. 1, 1989

[30] Foreign Application Priority Data

Nov. 17, 1987 [JP] Japan ................................. 62-288386

[51] Int. Cl.[5] ............................................. H02K 1/22
[52] U.S. Cl. ...................................... 310/262; 310/42; 310/51; 310/211; 74/573 R
[58] Field of Search .............. 310/261, 262, 264, 265, 310/267, 211, 212, 51, 217, 42, 168, 125, 169; 29/598; 74/573 R, 573 F, 574

[56] References Cited

U.S. PATENT DOCUMENTS

| | | | |
|---|---|---|---|
| 1,134,776 | 4/1915 | Thomson | 310/212 |
| 1,240,018 | 9/1917 | Bergman | 310/212 |
| 2,436,414 | 2/1948 | Arnemo | 310/212 |
| 4,309,635 | 1/1982 | Sei et al. | 310/211 |
| 4,641,886 | 2/1987 | Muck et al. | 74/573 R |
| 4,760,300 | 7/1988 | Yoshida et al. | 310/211 |

FOREIGN PATENT DOCUMENTS

| | | | |
|---|---|---|---|
| 0251098 | 4/1964 | Australia | 310/211 |
| 0695255 | 9/1964 | Canada | 310/211 |
| 0163254 | 9/1983 | Japan | 310/42 |
| 0048241 | 3/1987 | Japan | 310/211 |
| 54-154014 | 12/1987 | Japan | |
| 1129064 | 10/1968 | United Kingdom | 310/211 |

Primary Examiner—R. Skudy
Attorney, Agent, or Firm—Armstrong, Nikaido, Marmelstein, Kubovcik & Murray

[57] ABSTRACT

A rotor for high speed induction motor, having a stacked-lamination type rotor core (23) provided with axial opposite ends on which aluminum end rings (24) are assembled or fused by die casting, and balancing rings (25) provided as iron coverings enclosing the aluminum end rings (24), the iron balancing ring (25) being assembled or fused together with the above-mentioned end rings on the stacked-lamination type rotor core (23) by die casting.

3 Claims, 1 Drawing Sheet

ROTOR CONSTRUCTION FOR HIGH SPEED INDUCTION MOTOR

TECHNICAL FIELD

The present invention relates to the construction of a rotor for a high speed electric induction motor, and more particularly, to a reinforcing construction of aluminum end rings formed as integrated portions projecting from opposite ends of a rotor core when an aluminum material to be used as an electric conductor is poured by a die casting method, in a laminate-stacked core of a rotor, i.e., a rotor core.

BACKGROUND ART

An increase in the speed of rotation of motors to be used for driving the spindles of machine tools is urgently needed to satisfy current requirements for increasing the cutting and grinding speeds of machine tools. Alternate current electric induction motors are often used to drive the spindles of machine tools, and the rotor of the electric induction motor includes a rotor core usually formed by stacking a plurality of laminates obtained by punching from a silicone steel plate by a press machine, and cylindrical end rings formed by electroconductive aluminum material poured into opposite end portions of the rotor core, the aluminum material being also poured in the slots of the rotor core to form an electric closed circuit for the induction motor.

In the case of high speed electric induction motors, however, a problem arises in that the centrifugal force is increased in response to an increase in a speed of rotation of the induction motor, and such a large centrifugal force due to an increase in the motor speed causes a breakage of the aluminum end rings of the rotor. To prevent such breakage, the rotor of the electric induction motor has been designed and manufactured so as to have a small outer diameter.

It is well known that a high speed induction motor rotating at a high speed must be provided with a rotor which is dynamically balanced, and therefore, in a known construction of a high speed-induction motor, a balancing ring is disposed radially inside an aluminum end ring and is permanently attached to each axial end of the core of the rotor, whereby the rotor is dynamically balanced by drilling a balancing bore or bores in the balancing ring. At the same time, the balancing rings on the opposite ends of the rotor core are tightly engaged in the corresponding end rings of the rotor, to hold the rings in place against a centrifugal force acting on the aluminum end rings during a high speed rotation of the rotor of the induction motor.

In another conventional construction of a high speed induction motor, an iron ring is attached to the end ring of each of the opposite axial ends of the rotor by the press fit or shrink fit, to protect the end rings from breakage.

Nevertheless, the above-mentioned construction of the rotor for a high speed induction motor must still suffer from a problem such that the end rings of the rotor are apt to be broken due to a self expansion thereof caused by the Joule heat, and therefore, a further reinforcing of the end rings is needed. Particularly, the method of attaching the abovementioned iron ring to the end rings of the rotor brings an additional problem in that the process of manufacturing the high speed induction motors becomes complicated.

DISCLOSURE OF THE INVENTION

Therefore, an object of the present invention is to obviate the above-mentioned defects encountered by the high speed electric induction motor according to the prior art.

Another object of the present invention is to provide a construction of a rotor for a high speed electric induction motor, having sufficient strength to resist a centrifugal force acting thereon during a high speed rotation of the motor and a method of forming such a rotor.

A further object of the present invention is to provide a high speed electric induction motor by which the manufacturer thereof is simplified.

In accordance with the present invention, there is provided a construction of a rotor for a high speed electric induction motor including a stator capable of forming a rotatory magnetic field rotating at a high speed, the rotor having a stacked-lamination-type rotor core provided with axial opposite ends on which aluminum end rings are assembled by die-casting to be projected toward the outsides of the opposite ends, and coverings made of iron and enclosing the aluminum end rings of the rotor, the coverings being assembled or fused together with the end rings on the opposite ends of the stacked-lamination type rotor core by die casting and preferably utilized as balancing rings to dynamically balance the rotor. Namely, since the iron coverings are assembled to the rotor core by neither the conventional press-in method nor the shrinkage fit method, the assembly of the iron covering to the rotor core can be greatly simplified and the iron covering per se provide a strong reinforcing of the end rings.

BRIEF DESCRIPTION OF THE DRAWINGS

The above and other objects, features and advantages of the present invention will be made more apparent from the ensuring description of the accompanying drawings, wherein.

BEST MODE OF CARRYING OUT THE INVENTION

Figure 2:
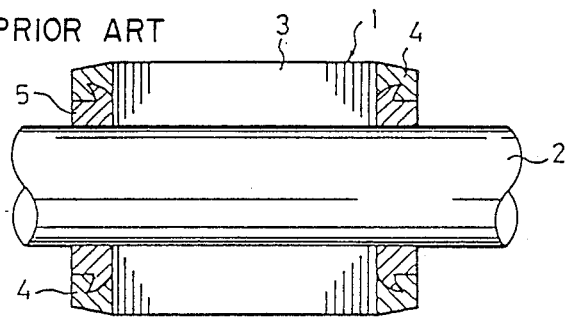
FIG. 2 and 3 are cross-sectional front views of a rotor construction for a high speed induction motor according to the prior art.
Figure 3:
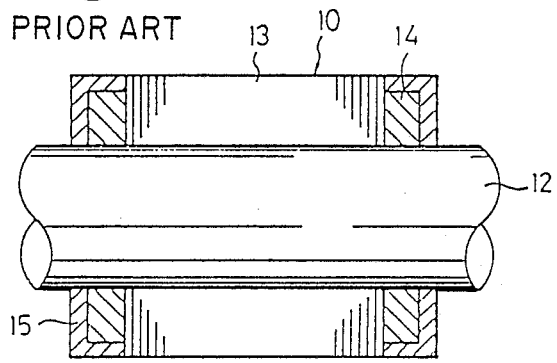

Referring first to FIGS. 2 and 3 illustrating two prior art, the above-mentioned conventional rotor constructions are shown. In FIG. 2, a rotor 1 is secured to a motor shaft 2 by a suitable fixing method such as a keying method, and has a rotor core 3 of the type wherein a plurality of lamination are stacked together. An end ring 4 forming an electric short circuit ring is disposed on and attached, by the diecasting method, to each of the opposite ends of the rotor core 3. A metallic balancing ring 5 is disposed radially inside each end ring 4 and tightly engaged therewith, to thereby prevent the end ring 4 from being broken by a centrifugal force applied thereto when rotating at a high speed. Nevertheless, the abovementioned construction for supporting the end rings 4 against the centrifugal force by the inwardly disposed balancing ring 5 is defective in the case of a large centrifugal force due to an increase in the rotating speed of the rotor.

On the other hand, another conventional rotor 10 illustrated in FIG. 3 is also provided with a lamination-stacked type rotor core 13 having an end ring 14 on each end thereof, in a manner similar to the construction of the rotor of FIG. 2. Here, however, each end ring 14 is entirely enclosed by an iron covering 15 attached to a rotor shaft 12 by the conventional press-fitting or shrink fitting methods. Nevertheless, in this construction of FIG. 3, the iron coverings 15 must be separately manufactured at a high accuracy, to enable a press fitting of the coverings on the end rings of the rotor core, and thus the manufacturing and assembly of the rotor become complicated.

Figure 1:
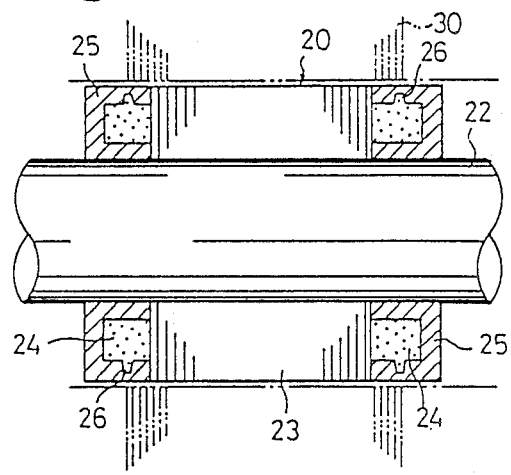
FIG. 1 is a cross-sectional front view of a rotor construction for a high speed induction motor according to an embodiment of the present invention.

Compared with the above-mentioned conventional construction of the rotor, a rotor 20 for a high speed induction motor, according to an embodiment of the present invention, is illustrated in FIG. 1, in which the rotor is rotatably mounted via rotary bearings (not shown) in a radially central position of a stator 30, and the rotor 20 is provided with a rotor core 23 made of a stack of a plurality of magnetic steel laminations.

The rotor core 23 has slots formed therein and filled with aluminum material to form an electric conductor (not shown in FIG. 1), and end rings 24 made of aluminum disposed on axially opposite outer ends thereof. These aluminum electric conductor and end rings 24 are provided by pouring melted aluminum material into a casting mold in which the rotor core 23 is accurately positioned by a jig, and allowing the aluminum material to fuse with the rotor core surfaces and harden.

The rotor core 23 having the aluminum electric conductor and end rings 24 is subsequently placed and positioned in a different casting mold, and melted iron material is poured into the casting mold to thereby form balancing rings 25 enclosing the end rings 24. As shown in FIG. 1, each balancing ring 25 is comprised of an annular ring having an outer surface and two legs which extend toward and are fused to an end surface of the rotor the rotor core 23 having the aluminum end rings 24 covered with the iron balancing rings 25 is fixed onto a motor shaft 22 to form the rotor 20, by an appropriate fixing method such as keying.

As stated above, during the manufacturing process of the rotor, the end rings 24 and the balancing rings 25 are subsequently formed by the continuously conducted die-casting processes. As a result, the manufacturing processes per se are simplified, and the fused connection between the balancing rings 25 and the rotor core 23 is very tight compared with the conventional construction in which the end rings are enclosed by separately manufactured coverings. Consequently, deformation or breaking of the aluminum end rings 24 by the effect of a centrifugal force is prevented.

Further, since the end rings 24 are completely enclosed by the iron balancing rings 25, an expansion and/or a deformation of the end rings 24 caused by Joule's heat generated by an electric current flowing through the end rings 24 can be prevented.

It should be appreciated that the balancing rings 25 are used not only for protecting the end rings but also for adjusting the dynamic balance of the rotor. Further, a complementary engaged portion or portions 26 are preferably provided, to provide a strong connection between the end rings 24 and the balancing rings 25.

From the foregoing description of the embodiment of the present invention, it will be understood that although a rotor for a high speed induction motor according to the present invention is similar to the conventional rotor construction, since the balancing rings enclosing the end rings of the rotor are formed by die-casting and fused to the rotor, the manufacturing process of the rotor can be simplified, thus achieving a reduction in the cost of manufacturing the rotor and an increase in the reinforcing function to protect the end rings. The rotor construction of the present invention can be applied not only for a high speed induction motor to be used as a rotary drive source but also as a built-in type high speed induction motor accommodated in a spindle of a machine tool.

We claim:

1. A rotor for a high speed induction motor, supported inside a stator capable of forming a rotatory magnetic field rotating at a high speed, and having a stacked-lamination-type rotor core provided with axially opposite ends to which aluminum end rings are provided to be projected toward outside of the opposite ends, wherein the improvement comprises:
   said aluminum end rings are fused to each of said opposite ends of said rotor, and
   coverings made of iron and enclosing said aluminum end rings of said rotor are disposed together with said end rings and fused to said end rings and said opposite ends of said stacked-lamination-type rotor core to thereby reinforce said end rings.

2. A rotor for high speed induction motor according to claim 1, wherein each of said iron coverings is comprised of an annular ring having an outer surface and two legs projecting inwardly toward said rotor core, the inner ends of each of said legs are fused to one end of said rotor core and said annular ring serves as a balancing ring.

3. A rotor for a high speed induction motor according to claim 1, wherein said aluminum end rings and said iron coverings include therein a complementary engagement construction.

* * * * *